3,095,256
VAT-DYE FLASH-AGING PRINTING PROCESS

Edward F. Scott, New Brunswick, and Ralph D. Greene, Basking Ridge, N.J., assignors to American Cyanamid Company, New York, N.Y., a corporation of Maine
No Drawing. Filed May 8, 1958, Ser. No. 733,803
15 Claims. (Cl. 8—70)

This invention relates to an improved printing process for vat dyes by the flash-aging process, and compositions therefor.

The flash-aging process has been used in the printing of vat dyes with a more or less conventional printing paste. It differs from the ordinary vat aging process in that the dyestuff is printed in a suitable paste, the fabric dried and then padded with a bath containing alkali, reducing agent (hydrosulfite) and other ingredients, such as sodium carbonate, sodium sulfate and the like. A typical pad bath would be represented by one having 2% sodium hydroxide, 11% sodium carbonate, 11% sodium sulfate, 8% sodium hydrosulfite and 68% water. The excess pad liquor is removed by squeeze rolls, and the wet fabric then passed through a steamer where it is exposed to live steam at about 220–230° F. Thereupon, the vat dyes are oxidized, for example, with a 1% hydrogen peroxide and ¼% glacial acetic acid solution. After oxidation the fabric is soaped at the boil, rinsed, and dried.

The standard printing paste is made up from suitable carbohydrate gums, such as cold water soluble modified locust bean gum and the like.

Flash-aging processes in the past h ave had a number of drawbacks.

(1) There is considerable surface dyeing which increased the tendency to crock.

(2) In the soaping step, which is essential to remove loose dye, there is a tendency for the loose dye to spread to unprinted portions of the cloth producing an effect which is known as "marking-off."

(3) The color yield is relatively low based on the expensive vat dye used.

On the other hand, the flash-aging method is much simpler than the conventional method. It is not necessary to incorporate alkali and reducing agent in the printing paste and it has therefore been used to considerable extent in spite of the above drawbacks. If it were possible to flash age vat dye prints without the drawbacks, this would represent an important practical advance for which there has long been a demand.

The first attempts to improve the process involved the use of oil-in-water emulsions in place of the carbohydrate gum in the printing paste. This process, which has achieved such great success in the ordinary vat dye printing procedures, proved to be unsuitable for the flash aging procedure. When printing pastes are made up with oil-in-water emulsions emulsified with the ordinary emulsifying agents, prints tended to flush or bleed into the edge of the undyed fabric adjacent to the printed design when passed through the chemical pad bath. This decreased the sharpness and crispness of the design and rendered the procedure impractical for commercial use.

The present invention is based on the discovery that if certain definite amounts of oil or solvent soluble resins are used as emulsifiers to produce oil-in-water emulsions, excellent prints can be obtained by the flash aging method, which have neither the disadvantages of the conventional pritns made with carbohydrate gums or oil-in-water emulsions prepared with conventional emulsifying agents. Not only are prints obtained without flushing or bleeding, but increased strength results, usually from 15 to 60% increase in color value over the standard gum procedure and with most dyes from 50 to 60%.

It is also possible to overprint one color on another without the necessity of waiting for the first color to penetrate the fabric. This is of large practical advantage where multicolor prints are needed. Another advantage of the present invention is that relatively large colored surfaces can be produced, such as large blotch prints. The whole surface is uniformly colored in spite of the well known fact that cotton and other cellulosic fabrics tend to contain motes and certain amounts of foreign material, which in many dyeing procedures are difficult to color and result in nonuniformity.

Just why the flash aged prints of the present invention can be used for uniform large-blotch printing is not known. Nor is it known just why the oil-in-water emulsion pastes of the present invention do not bleed or flush as do other oil-in-water emulsions prepared with conventional emulsifying agents. No theory is advanced as to this remarkable behavior of the particular emulsions of the present invention and it is not intended to limit the invention to any theory of why the improved results are obtained.

A further practical advantage of the present invention is that the emulsions can be used with vat dyes either in the powder or paste form. Neither form breaks the emulsion and smooth uniform printing pastes are readily prepared. The printer is thus given a wide range and great flexibility in the nature of the dyes which he uses.

The amount of the oil- or solvent-soluble resin which are used as emulsifiers in the present invention is quite critical. It must be kept below 0.5% as otherwise there is a tendency to form water-in-oil emulsions, which are the ordinary type of emulsions that result when such an emulsifier is used.

There is, of course, a practical lower limit below which stable emulsions cannot be prepared and, in general, the amount of emulsifier should be from 0.125 to 0.4%.

The oil or solvent soluble resins belong to a number of different classes. The first type is a medium-oil length, oxidizing type (modified), alkyd resin containing the acids of soya and/or dehydrated castor oil. The second type is a styrenated alkyd resin. The third is alkylated melamine formaldehyde resin with 2 to 4 of the methylol groups alkylated, preferably butylated melamine formaldehyde resin. The fourth type is a long oil linseed-modified alkyd resin. The resins are normally obtained in solution in solvents. Thus, for example, the medium and long oil alkyd resins are dissolved in mineral spirits, styrenated alkyds dissolved in mineral spirits or in xylene and the alkylated melamine formaldehyde resin dissolved in a mixture of butanol and xylene or aromatic petroleum spirit.

It is an advantage of the invention that the vat dyes may be incorporated in the emulsion either in the form of powders or pastes. With most of the powders, it is desirable in order to promote more rapid dispersion, to colloidize them by coating vat dye particles with a hydrophilic protective agent, such as dextrin, so that the powders have a high degree of autodispersibility. In most of the specific examples in the present case, the dye powders are colloidized and where there is no specific statement to the contrary, it will be understood that all of the dye powders are the colloidized type. The colloidization process is described in the Crossley, Kienle and Royer Reissue Patent No. 21,402.

It is an advantage of the invention that the oil used in the emulsion is not critical. Any of the usual water insoluble oils may be used. Preferably, however, hydrocarbon oils are used which may be petroleum fractions and which may be aliphatic or predominately aromatic. It is desirable not to use an oil phase that is too non-volatile and so oils which have an upper boiling range of 300–400° C. represent about as high a boiling point as is practically useful. Somewhat more volatile oils are preferred, such as those having boiling point ranges between 100 and 300° C.

The viscosity of the oil may vary from as low as 5 centipoises or somewhat less up to oils having a viscosity of 60 poises. The viscosity of the oil will depend somewhat on the nature of the surface to be printed. Fine shallow engraved printing rolls require emulsions with oils in the lower viscosity range.

The emulsions in general are prepared in fairly high speed emulsifying equipment. However, some commercial printers do not have high speed equipment and in such cases a small amount of gum, for example, from 1% to 2% of ordinary hydrophilic gums, such as cold water soluble modified locust bean gum, starch ether, mannogalactans, carboxymethyl cellulose and the like will give satisfactory body to the emulsion without requiring as high speed emulsifying equipment.

In the examples to follow, many of the vat dyes are given by color index number. As there is the transition between the old color index and the new color index, some of the dyes are listed under their old number and some under the new. The abbreviation C.I. is used for the old color index number and N.C.I. for the new color index number. In the examples, the parts are by weight unless otherwise specified.

Example 1

2225 parts of water are placed in a container and a high speed stirrer of the shearing type introduced. 25 parts of a 50% solids styrenated alkyd resin dissolved in a petroleum solvent of predominately aromatic character are thinned with 250 parts of xylene and added to the water with moderate speed stirring. Thereupon, 7500 parts of petroleum mineral spirits are slowly added and after all of the solvent has been added, the speed of stirring is increased to high speed and maintained until a smooth, white oil-in-water emulsion results which has the following constitution:

|  | Percent |
|---|---|
| Water | 22.25 |
| Resin (real) | 0.125 |
| Xylene | 2.5 |
| Mineral spirits | 75.125 |
| Total | 100.00 |

95 parts of the above oil-in-water emulsion and 5 parts of a colloidized double-strength vat dye powder, C.I. 1101, are stirred in until a smooth, even colored emulsion results.

As a control, the same amount of vat dye powder is added to 95 parts of a 4% dispersion in water of a cold-water soluble, modified locust bean gum.

The two pastes are then screen printed on 80 x 80 pieces of bleached unmercerized cotton fabric and dried. Both printed fabrics are then passed through a chemical pad bath having the composition:

|  | Percent |
|---|---|
| Sodium hydroxide | 2 |
| Sodium carbonate | 11 |
| Glauber's salt | 11 |
| Dyeing hydro (Na$_2$S$_2$O$_4$) | 8 |
| Water | 68 |
| Total | 100 |

As this pad bath will be used in all of the examples, its composition will not be repeated and will be referred to merely as the "chemical pad bath." Excess bath is squeezed out and, without drying, the fabrics are passed directly into a steam ager for 25 seconds at 225° F. The aged fabrics are then oxidized for 1 minute in a 1% hydrogen peroxide and 0.25% glacial acetic acid solution at 135° F. They are then rinsed, soaped in a 0.1% sodium carbonate and 0.1% soap solution at the boil for 5 minutes, rinsed and dried. This aging, oxidizing and rinsing procedure will be used in all of the examples. The two prints were then compared, the print from the oil-in-water emulsion being 60% stronger than the control and showing outstanding uniformity, even with blotch patterns

Example 2

The effect of the amount of resin was tested by repeating Example 1, first with 0.5% of resin and then with 0.35%. The larger amount of resin produced an unsatisfactory emulsion which started to become unstable, whereas when the percentage of resin was dropped back to 0.35%, an excellent stable emulsion resulted which gave prints substantially identical with those of Example 1.

Example 3

The procedure of Example 1 is repeated using a commercial colloidized vat scarlet powder and consisting of 40% 6,6'-dichloro-4,4'-dimethyl-2,2'-thioindigo and 60% of a vat dye, C.I. 1217.

The color prints from the oil-in-water emulsion are about 50% stronger than the control.

Example 4

The procedure of Example 1 is repeated using a comcercial colloidized vat dye powder of the black vat dye obtained by the caustic fusion of nitrodibenzanthrone.

The control print is made on two fabrics, one cotton and the other spun viscose rayon. Prints from the oil-in-water emulsion are about 60% stronger than the control.

The example is repeated with a series of colloidized vat dyes, C.I. 1095, C.I. 1096, C.I. 1099, C.I. 1113, C.I. 1118, C.I. 1133, C.I. 1137, C.I. 1157, C.I. 1161 and C.I. 1165. In each case, the color value of the prints obtained from the oil-in-water emulsions are stronger than the control, although showing slight variations between 40 and 60% stronger. Also, the uniformity of the prints from the oil-in-water emulsion is consistently greater than that of the controls.

Example 5

The procedure of Example 1 is repeated with a series of resins to prepare the oil and water emulsion. The resins are as follows:

Resin No. 1: A 50% solids medium-oil oxidizing type alkyd resin containing soya and dehydrated castor oils dissolved in 50% mineral spirits.

Resin No. 2: A 50% solids styrenated alkyd resin dissolved in a petroleum solvent of predominately aromatic character.

Resin No. 3: A 60% solids styrenated alkyd resin dissolved in 40% xylene. Sufficient additional xylene was added to reduce the strength of the resin to 50% solids.

Resin No. 4: A 50% solids butylated melamine formaldehyde resin in which about 3–4 of the methylol groups are butylated, dissolved in 30% butanol and 20% xylene.

Resin No. 5: A 60% solids butylated melamine in petroleum aromatic solvent (40%) in which 2–3 of the methylol groups are butylated. This resin was likewise cut with petroleum aromatic solvent to bring the solids to a 50% basis.

Five parts of the colloidized commercial vat dye powder of Example 1 is then stirred into 95 parts of each of the emulsions and test printed with a gum thickened control printing paste as described in Example 1.

In each case, the color value of the print from the oil-in-water emulsions is much stronger than the print from the control, the results being substantially the same as Example 1, but showing slight variations between the different resins.

Example 6

Into 502 parts of water, 6 parts of cold water soluble modified locust bean gum and 6 parts of cold water soluble starch ether are sprinkled and stirred at low to moderate speed until uniformly dissolved or dispersed, then a solution of 5.0 parts of the 50% resin solution described in Example 1 is added and the mixture thinned with 25 parts of xylene and 100 parts of mineral spirits. After emulsification, 358.5 parts of additional mineral spirits are slowly added while maintaining the moderate stirring and after the addition is complete, the stirring speed is increased to high speed until a white, creamy homogeneous oil-in-water emulsion is obtained.

92 parts of the above emulsion and 8 parts of a commercial paste of the black dye of Example 4 are stirred in until a smooth, colored emulsion results. This is then printed on both cotton and spun viscose rayon, as described in Examples 1 and 4, control prints using the same commercial vat dye paste on both fabrics being made as described in Example 1.

On comparison, the prints from the oil-in-water emulsion show a 50% increase in strength on cotton and 60% increase in strength on spun viscose. In each case, the shade is brighter and the ground color more uniform.

*Example 7*

The procedure of the preceding example is repeated increasing the resin content to 0.4% real. The emulsion is then printed on cotton cloth together with the control. Comparison shows the print from the oil-in-water emulsion to be 50% stronger than the control.

*Example 8*

An emulsion is prepared by adding 12 parts of high viscosity carboxymethyl cellulose to 502 parts of water with moderate stirring until complete dispersion results. Thereupon, 2.5 parts of a resin solution of Example 1, diluted with 25 parts of xylene, are stirred in followed by 458.5 parts of mineral spirits. After all of the mineral spirits are added, the speed of stirring is increased to high speed and maintained until a smooth, uniform homogeneous emulsion results.

A printing paste is then prepared using 94 parts of the above emulsion and 6 parts of a commercial vat dye paste, C.I. 1113. A second printing paste was prepared with the same amount of emulsion and 6 parts of vat dye, N.C.I. 59100. Control printings with both of the dyes are made with ordinary gum paste described in Example 1 and the printed material finished in the same manner. The prints from the oil-in-water emulsions are much stronger in color value than the control, brighter and more uniform.

*Example 9*

Emulsions are prepared according to Example 6, but using each of the resins described in Example 5.

Printing pastes are then prepared from 94 parts each of the above emulsions and 6 parts each of the following vat dye pastes: N.C.I. 59100, C.I. 1113 and 6,6'-dichloro-4,4'-dimethyl-2,2'-thioindigo. Each of the 18 resulting pastes are then screen printed on both cotton and spun rayon fabrics with controls on each fabric as described in Example 1 using the padding, flash aging, rinsing, oxidizing and other finishing treatments of Example 1.

In every case, the prints from the emulsion printing pastes show markedly increased strength over the control, varying slightly from resin to resin and color to color. Improved uniformity is also noted in each case.

*Example 10*

The procedure of Example 1 is used with half the quantity of a 50% solids medium oil oxidizing type alkyd resin containing soya and dehydrated castor oils in mineral spirits and half the styrenated alkyd resin solution described in Example 1. The mixed resins produce the same stable emulsion and, when printed, greatly increased color value is obtained over the control print.

*Example 11*

The preceding example is repeated replacing the medium oil oxidizing alkyd resin with a butylated melamine resin dissolved in 40% petroleum solvent of predominately aromatic character. The butylated melamine resin has 2 to 3 of the methylol groups butylated. As in the preceding example, the prints from the oil-in-water emulsion with a mixed resin show superior color values compared to the control.

We claim:

1. An oil-in-water type emulsion, suitable as a vehicle for the coloring of fibrous cellulosic material, comprising a hydrocarbon oil, water and an emulsifying agent comprising a medium oil, oxidizing type, (modified) alkyd resin containing soya and dehydrated castor oils, the amount of said resin emulsifier being less than 0.5% by weight of the emulsion.

2. A vehicle according to claim 1 in which the resin is present in an amount from about 0.1 to about 0.4 weight percent.

3. An emulsion according to claim 1 containing a small amount of a cold water dispersible hydrophilic gum.

4. An oil-in-water type emulsion, suitable as a vehicle for the coloring of fibrous cellulosic material, comprising a hydrocarbon oil, water and an emulsifying agent comprising a styrenated alkyd resin, the amount of said resin emulsifier being less than 0.5% by weight of the emulsion.

5. A vehicle according to claim 4 in which the resin is present in an amount from about 0.1 to about 0.4 weight percent.

6. An emulsion according to claim 4 containing a small amount of a cold water dispersible hydrophilic gum.

7. An oil-in-water type emulsion, suitable as a vehicle for the coloring of fibrous cellulosic material, comprising a hydrocarbon oil, water and an emulsifying agent comprising an oil-soluble alkylated melamine-formaldehyde resin, the amount of said resin emulsifier being less than 0.5% by weight of the emulsion.

8. A vehicle according to claim 7 in which the resin is present in an amount from about 0.1 to about 0.4 weight percent.

9. An emulsion according to claim 7 containing a small amount of a cold water dispersible hydrophilic gum.

10. An oil-in-water type emulsion, suitable as a vehicle for the coloring of fibrous cellulosic material, comprising a hydrocarbon oil, water and an emulsifying agent comprising a butylated melamine-formaldehyde resin, the amount of said resin emulsifier being less than 0.5% by weight of the emulsion.

11. An emulsion according to claim 10 containing a small amount of a cold water dispersible hydrophilic gum.

12. In a process for coloring cellulosic material with a water-insoluble vat dye including the steps of (1) forming an oil-in-water type printing emulsion comprising water and said vat dye as the external phase and as the internal phase a water-immiscible oil and an oil-soluble emulsifier, (2) printing with said emulsion on said cellulosic material, (3) padding in a chemical pad bath comprising an alkali and a reducing agent, (4) removing the excess pad bath liquor and (5) "flash aging" resultant wet cellulosic material by subjecting it to steam to reduce said vat dye and oxidizing the dye on the fabric; the improved procedure whereby increased color yield and decreased flushing of dye are obtained which comprises using in said internal phase an emulsifier comprising from about 0.1 to less than 0.5 weight percent of a medium oil, oxidizing type, (modified) alkyd resin containing soya and dehydrated castor oils.

13. In a process for coloring cellulosic material with a water-insoluble vat dye including the steps of (1) forming an oil-in-water type printing emulsion comprising water and said vat dye as the external phase and as the internal phase a water-immiscible oil and an oil-soluble emulsifier, (2) printing with said emulsion on said cellulosic material, (3) padding in a chemical pad bath comprising an alkali and a reducing agent, (4) removing the excess pad bath liquor and (5) "flash aging" resultant wet cellulosic material by subjecing it to steam to reduce said vat dye and oxidizing the dye on the fabric; the improved procedure whereby increased color yield and decreased flushing of dye are obtained which comprises using in said internal phase an emulsifier comprising from about 0.1 to less than 0.5 weight percent of a styrenated alkyd resin.

14. In a process for coloring cellulosic material with a water-insoluble vat dye including the steps of (1) forming an oil-in-water type printing emulsion comprising water and said vat dye as the external phase and as the internal phase a water-immiscible oil and an oil-soluble emulsifier, (2) printing with said emulsion on said cellulosic material, (3) padding in a chemical pad bath comprising an alkali and a reducing agent, (4) removing the excess pad bath liquor and (5) "flash aging" resultant wet cellulosic material by subjecting it to steam to reduce said vat dye and oxidizing the dye on the fabric; the improved procedure whereby increased color yield and decreased flushing of dye are obtained which comprises using in said internal phase an emulsifier comprising from about 0.1 to less than 0.5 weight percent of an oil-soluble alkylated melamine-formaldehyde resin.

15. In a process for coloring cellulosic material with a water-insoluble vat dye including the steps of (1) forming an oil-in-water type printing emulsion comprising water and said vat dye as the external phase and as the internal phase a water-immiscible oil and an oil-soluble emulsifier, (2) printing with said emulsion on said cellulosic material, (3) padding in a chemical pad bath comprising an alkali and a reducing agent, (4) removing the excess pad bath liquor and (5) "flash aging" resultant wet cellulosic material by subjecting it to steam to reduce said vat dye and oxidizing the dye on the fabric; the improved procedure whereby increased color yield and decreased flushing of dye are obtained which comprises using in said internal phase an emulsifier comprising from about 0.1 to less than 0.5 weight percent of a butylated melamine-formaldehyde resin.

References Cited in the file of this patent

UNITED STATES PATENTS

| | | |
|---|---|---|
| 2,202,283 | Cassel | May 28, 1940 |
| 2,288,992 | Cassel | July 7, 1942 |
| 2,587,905 | Saville | Mar. 4, 1952 |
| 2,907,624 | Saville | Oct. 6, 1959 |

FOREIGN PATENTS

| | | |
|---|---|---|
| 439,524 | Great Britain | Dec. 9, 1935 |

OTHER REFERENCES

Saville: American Dyestuff Reporter, February 14, 1955, pp. 105–107.

Ellis: Printing Inks, Reinhold Pub. Co., 1940, p. 280.